US005768385A

United States Patent [19]

Simon

[11] Patent Number: 5,768,385

[45] Date of Patent: Jun. 16, 1998

[54] UNTRACEABLE ELECTRONIC CASH

[75] Inventor: Daniel R. Simon, Redmond, Wash.

[73] Assignee: Microsoft Corporation, Redmond, Wash.

[21] Appl. No.: 521,124

[22] Filed: Aug. 29, 1995

[51] Int. Cl.[6] .......... H04L 9/00; H04L 9/30

[52] U.S. Cl. .......... 380/24; 380/23; 380/25; 380/30; 380/49

[58] Field of Search .......... 380/23, 24, 25, 380/29, 30, 49, 59, 4, 9, 50

[56] References Cited

U.S. PATENT DOCUMENTS

| | | | |
|---|---|---|---|
| 4,914,698 | 4/1990 | Chaum | 380/30 |
| 4,947,430 | 8/1990 | Chaum | 380/25 |
| 4,949,380 | 8/1990 | Chaum | 380/30 |
| 4,987,593 | 1/1991 | Chaum | 380/30 X |
| 4,991,210 | 2/1991 | Chaum | 380/30 |
| 4,996,711 | 2/1991 | Chaum | 390/30 |
| 5,131,039 | 7/1992 | Chaum | 380/23 |
| 5,276,736 | 1/1994 | Chaum | 380/24 |
| 5,373,558 | 12/1994 | Chaum | 380/23 |

OTHER PUBLICATIONS

A. Pfitzmann, "How to Implement ISDNs Without User Observability—Some Remarks," TR 14/85, Fakultät für Informatik Universität Karlsruhe, 1985.

Okamoto, et al., "Universal Electronic Cash," Proc. CRYPTO 191, Springer-Verlag (1992), pp. 324–337.

Rompel, "One-Way Functions Are Necessary and Sufficient for Secure Signatures," Proc. 31st IEEE Symp. on Foundations of Computer Science (1990), pp. 387–394.

Brands, "Untraceable Off-line Cash in Wallet with Observers" Proc. CRYPTO '93, Springer-Velag (1994) pp. 302–318.

Yacobi, "Efficient Electronic Money," Proc. ASIACRYPT 194, Springer-Verlag (1994).

Rackoff, et al. "Cryptographic Defense Against Traffic Analysis," Proc. 25th ACM Symp. on the Theory of Computation (1993).

Chaum, "Online Cash Checks," Proc. EUROCRYPT '89, Springer-Verlag (1989), pp. 288–293.

Chaum, "The Dining Cryptographers Problem: Unconditional Sender and Recipient Untraceability," Journal of Cryptology, vol. 1, No. 1 (1988), pp. 65–75.

Chaum, "Privacy Protected Payments—Unconditional Payer and/or Payee Untraceability," Smart Card 2000: The Future of IC Cards—Proc. IFIP WG 11.6 Int'l Conf. North-Holland (1989) pp. 69–93.

Pfitzmann, et al. "ISDN-MIXes—Untraceable Communication with Very Small Brandwidth Overhead," Proc. Kommunikation in verteilten Systemen (1991), pp. 451–463.

Even, et al. "Electronic Wallet," Proc. CRYPTO '83, Plenum Press (1984), pp. 383–386.

Chaum, et al. "Untraceable Electronic Cash," Proc. CRYPTO '88, Springerverlag (1990), pp. 319–327.

Franklin, et al., "Secure and Efficient Off-Line Digital Money," Proc. 20th Int'l Colloquim on Automata Languages and Programming, Springer-Verlag (1993), pp. 265–276.

Chaum, "Achieving Electronic Privacy," Scientific American, vol. 267, No. 2 (1992), pp. 96–101.

Chaum, "Untraceable Electronic Mail, Return Addresses, and Digital Pseudonyms," CACM, vol. 24, No. 2 (1981) pp. 84–88.

*Primary Examiner*—Bernarr E. Gregory

*Attorney, Agent, or Firm*—Michaelson & Wallace; Peter L. Michaelson

[57] ABSTRACT

An electronic cash protocol including the steps of using a one-way function $f_1(x)$ to generate an image $f_1(x_1)$ from a preimage $x_1$; sending the image $f_1(x_1)$ in an unblinded form to a second party; and receiving from the second party a note including a digital signature, wherein the note represents a commitment by the second party to credit a predetermined amount of money to a first presenter of the preimage $x_1$ to the second party.

30 Claims, 2 Drawing Sheets

UNTRACEABLE ELECTRONIC CASH

BACKGROUND OF THE INVENTION

The invention generally relates to electronic cash systems.

The ultimate intuitive goal of an electronic cash system is to combine the best features of physical cash (privacy, anonymity, unforgeability) with the best features of electronic commerce (speed, ease and potential security of transport and storage). The fundamental difficulty with attempting to implement anonymous electronic cash, however, is simple to state: if the possessor of an electronic "coin" is not identified in two successive transactions, then how is he or she to be prevented from acting as if the first transaction never occurred, and spending the same coin again. The first proposed solution to this problem was presented by Chaum, Fiat and Naor (see D. Chaum, A Fiat and M. Naor, Untraceable Electronic Cash, Proc. CRYPTO '88, Springer-Verlag (1990), pp. 319–327.), and was based on the premise that it would be sufficient for such "double spending" to be detected, and the spender identified, upon presentation of the same "electronic coin" twice to the central bank. This premise has also been used in a number of other proposed solution, all with the advantage that the bank need not be involved in each transaction. Practically speaking, however, this premise has enormous drawbacks. Fraudulent transactions are detected only long after they have taken place, and if the perpetrator can be confident of not being brought to justice (either by being inaccessible or by managing to use someone else's identity and cash), then he or she can double-spend at will.

However, if such fraudulent use of electronic cash is to be prevented, then some authority must somehow be involved in each transaction as it occurs, so as to be able to recognize and alert targets of double-spending. How, then, is anonymity to be preserved. One approach is to rely on tamper-resistant hardware to force spenders to behave "honestly" (ie., not to double-spend) (see, for example, S. Even, O. Goldreich and Y. Yacobi, Electronic Wallet, Proc. CRYPTO '83, Plenum Press (1984), pp. 383–386.). Schemes based on this premise are, however, extremely "brittle". If anyone ever succeeds in tampering with the hardware, then not only is that person capable of double-spending, but anyone, anywhere who obtains (e.g. purchases, perhaps) the information hidden in the hardware can spend arbitrarily high amounts at will. Current tamper resistance technology is far from being dependable enough to be trusted to thwart such an enormous risk.

Another approach is cryptographic. For example, under certain very strong cryptographic assumptions, it is possible to construct protocols that create "blinded" cash—information which can be recognized later as valid cash, but cannot be connected with any particular run of the protocol. (See, for example, D. Chaum, Privacy Protected Payments—Unconditional Payer and/or Payee Untraceability, SMART CARD 2000: The Future of IC Cards—Proc. IFIP WG 11.6 Int'l Conf., North-Holland (1989), pp. 69–93; and D. Chaum, Online Cash Checks, Proc. EUROCRYPT '89, Springer-Verlag (1989), pp. 288–293.)

SUMMARY OF THE INVENTION

We present a simple, practical online electronic cash system based on the assumption of a network in which anonymous, untraceable communication is possible. In general, the invention uses two simple primitives, namely a one-way function and a signature scheme. These are both well known in the art; and descriptions can be found in publicly available literature on cryptography, e.g. Applied Cryptography, Bruce Schneier, John Wiley & Sons, Inc. (1994). The anonymity of spenders as well as guaranteeing their electronic coins'validity, but also the coins used are unforgeable and cannot be spent more than once.

In general, in one aspect, the invention is an electronic cash protocol including the steps of using a one-way function $f_1(x)$ to generate an image $f_1(x_1)$ from a preimage $x_1$; sending the image $f_1(x_1)$ in an unblinded form to a second party; and receiving from the second party a note including a digital signature. The received signed note represents a commitment by the second party to credit a predetermined amount of money to a first presenter of the preimage $x_1$ to the second party.

Preferred embodiments include the following features. The electronic cash protocol also includes sending the preimage $x_1$ to a third party as payment for purchase of goods or services from the third party. Alternatively, it further includes selecting a second preimage $x_2$; using a second one-way function $f_2(x)$ to generate a second image $f_2(x_2)$ from the second preimage $x_2$; sending the first preimage $x_1$ and the unblinded form of the second image $f_2(x_2)$ to the second party; and receiving from the second party a note including a digital signature, the note representing a commitment by the second party to credit the predetermined amount of money to a first presenter of the second preimage $x_2$ to the second party. In both cases, $f_1(x)$ and $f_2(x)$ are the same function. In the latter case, the sending of the first preimage $x_1$ and the unblinded form of the second image $f_2(x_2)$ to the second party is performed anonymously and the second party is a bank.

Also in preferred embodiments, the protocol includes the steps of concatenating a signature key of a third party with the first preimage $x_1$ to form a block of information; encrypting the block of information by using an encryption key of the second party to generate an encrypted block of information; and sending the encrypted block of information to the third party.

In general, in another aspect, the invention is an electronic cash protocol including the steps of receiving a first preimage $x_1$ from a first party, wherein the preimage $x_1$ produces a first image $f_1(x_1)$ when processed by a first one-way function $f_1(x)$ and there being associated with said first preimage $x_1$ a commitment by a second party to credit a predetermined amount ofmoney to a first presenter to the second party of said first preimage $x_1$; selecting a second preimage $x_2$ ; using a second one-way function $f_2(x)$ to generate a second image $f_2(x_2)$ from the second preimage $x_2$; sending the first preimage $x_1$ and an unblinded form of the second image $f_2(x_2)$ to the second party; and receiving from the second party a note including a digital signature, wherein the note represents a commitment by the second party to credit the predetermined amount of money to a first presenter of the second preimage $x_2$ to the second party.

In general, in yet another aspect, the invention is an electronic cash protocol including the steps of receiving from a first party an encrypted block of information, wherein the block of encrypted information was generated by first concatenating a public signature key of a second party with a first preimage $x_1$ to form a block of information and then encrypting the block of information by using an encryption key of a third party; selecting a second preimage $x_2$; using a second one-way function $f_2(x)$ to generate an image $f(x_2)$ from the preimage $x_2$; forming a message including the encrypted block of information along with the image $f(x_2)$ in an unblinded form; sending the message to the third party; and receiving from the third party a signed note including a digital signature, wherein the note represents a commitment by the third party to credit a predetermined amount of money to a first presenter of the preimage $x_2$ to the third party.

In general, in still another aspect, the invention is an electronic cash protocol including the steps of receiving from a first entity an unblinded form of an image $f_1(x_1)$ that was generated by applying a one-way function $f_1(x)$ to a preimage $x_1$; generating a message which contains a commitment to credit a predetermined amount of money to a first presenter of the preimage $x_1$; signing the message with a digital signature; and sending the message along with the digital signature to the first party.

In preferred embodiments, the electronic cash protocol also includes subsequently receiving the preimage $x_1$ from a third party; checking a database for the preimage $x_1$; if the preimage $x_1$ is not found in the database, crediting the third party with the predetermined amount of money; and adding the preimage $x_1$ to the database. Alternatively, the protocol includes subsequently receiving the preimage $x_1$ and an unblinded image $f_2(x_2)$ from a third party, wherein the unblinded image $f_2(x_2)$ was generated by applying a one-way function $f_2(x)$ to a preimage $x_2$; checking a database for the preimage $x_1$; if the preimage $x_1$ is not found in the database, generating a signed note including a digital signature, wherein the note represents a commitment to credit the predetermined amount of money to a first presenter of the preimage $x_2$; and adding the preimage $x_1$ to the database.

Also in preferred embodiments, the invention features receiving a message from a second party, wherein the message was generated by concatenating an encryption key of a third party with a first preimage $x_1$ to form a block of information, by encrypting the block of information by using a first encryption key to generate an encrypted first block, and by concatenating an unblinded image $f_2(x_2)$ to the encrypted first block of information, wherein the unblinded image $f_2(x_2)$ was generated by using a one-way function $f_2(x)$ to generate an image $f_2(x_2)$ from a preimage $x_2$. It further features decrypting the encrypted first block of information; generating a note including a digital signature, wherein the note represents a commitment to credit a predetermined amount of money to a first presenter of the preimage $x_2$; and sending the note to the second party.

In general, in yet another aspect, the invention is an electronic cash protocol including the steps of sending an unblinded image $f_2(x_2)$ to a second party, wherein the unblinded image $f_2$ ($x_2$ ) was generated by applying a one-way function $f_2(x)$ to a preimage $x_2$; receiving a signed note from the second party, wherein the unblinded note includes a digital signature and represents a commitment to credit the predetermined amount of money to a first presenter of the preimage $x_2$; and in response to receiving the unblinded note from the second party, authorizing the delivery of goods and/or services to a third party.

The invention offers a simple, inexpensive way of doing cash-like transactions where the item of exchange (i.e., the withdrawn coin) has the properties of actual cash. For example, it is: (1) more or less anonymous; (2) secure; (3) inexpensive to use; and (4) easy to carry around and exchange.

Parties are protected against a dishonest bank's reneging on withdrawn coins by the fact that they keep secret the value $x_1$ for a particular coin until it is spent. As long as a particular coin $f(x_1)$ is deposited publicly and non-anonymously, the bank can be required to honor it unless it can supply the associated $x_1$. Of course, the bank can renege on an anonymously exchanged coin $f(x_1)$ during the actual exchange, by claiming upon receiving $x_1$ that the coin has already been spent. However, the bank cannot possibly know who is being cheated by such a "dine and dash" ploy, and is therefore vulnerable to monitoring and public exposure.

Finally, banks themselves are protected against counterfeiting by the security of the digital signature scheme used to sign electronic coins. Moreover, they are protected against "double-spending" (or "double deposit") by their ability to store $x_1$ values for coins in perpetuity.

Other advantages and features will become apparent from the following description of the preferred embodiment and from the claims.

DESCRIPTION OF THE PREFERRED EMBODIMENTS

The ability to communicate anonymously is in some sense necessary a priori if anonymous cash transactions are to occur, since information about a party's communications will obviously reveal information about the party's business dealings. In practice, the anonymity of communication may be based on nothing more than confidence that the telephone company safeguards the confidentiality of its system. Alternatively, parties may place trust in one or more "anonymous remailers" to obscure identities of the parties , or rely on an implementation of one of the other techniques from the publicly available literature.

Figure 1:
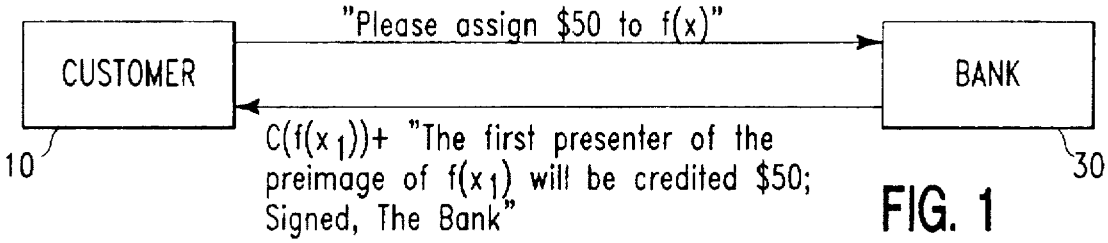
FIG. 1 is a diagram of a non-anonymous withdrawal protocol.

Suppose, not only that communications between parties are anonymous with respect to third parties, but also that the communicating parties are anonymous to each other. (In typical implementations, the latter condition is a natural consequence of the former, barring self-identification.) A simple, somewhat anonymous electronic cash protocol in such a setting is shown in FIG. 1.

In the following descriptions of various protocols (see FIGS. 1–7), we generally refer to three parties, namely, a Customer 10, a Vendor 20, and a Bank 30. Customer 10 is of course generally representative of the payor and Vendor 20 is generally representative of the payee. It should be understood, however, that these designations are chosen for purposes of clarity and that they are not meant to limit the scope of the invention. It would be just as valid to have referred to them as Party A, Party B and Party C.

In the figures, the different entities are represented by blocks and the transfers of information from one entity to another are indicated by lines interconnecting the appropriate blocks. Each line represents a transfer of certain information from one entity to another in the direction indicated by an arrow at the end of the line. The information that is transferred is summarized symbolically below the lines.

Though each block is labeled and will be described below as representing a particular entity, it can be implemented by a computing device which performs the computations and the communications that are carried out by that entity. The computing devices might be any of a large variety of electronic devices including, for example, a personal computer, a PCMCIA card, a PDI, a smart-card, a palm-top computer, or a more powerful workstation, just to name a few. The bark side of the protocols that are described below can be implemented by a server programmed to handle electronic transactions, similar to those which currently handle ATM transactions. The server would have multiple telephone lines coming into it and include data storage capability for storing the relevant data.

It should of course also be understood that the computing devices include, either internally or externally, all of the memory that is required for the data and programs that are involved in implementing the protocols. Further more, they include devices (e.g. a modem) which enable them to communicate with other computing devices. In addition, the communications media over which the transfers of information take place can also be any of a large number of possibilities, including telephone lines, cable, the Internet, satellite transmissions, or radio transmissions, for example. In other words, it is not intended that the invention be limited with regard to either the types of devices that are used or the methods of communication that are employed. The possibilities and combinations are limited only by one's imagination.

For the following protocols, it is assumed that Bank 30 chooses and makes publicly available a one-way function f(x). Alternatively, such a function could be made publicly available by any party so long as all parties to the transactions can access and use it. In general, by a one-way function, we mean a function f(x) such that using $x_1$ produces $f(x_1)$ and given $f(x_1)$ you cannot determine $x_1$. In the following description, $x_1$ will also be referred to as a preimage of $f(x_1)$ and $f(x_1)$ will be referred to as an image of $x_1$.

In practice, perfect one-way functions may not actually exist. That is, for all functions now believed to be one way functions, there may eventually be sufficient computing power or techniques for determining $x_1$ given $f(x_1)$. Thus, by the phrase one-way function, we mean to also include those functions for which it is very difficult, but not necessarily impossible, to compute $x_1$ by knowing $f(x_1)$.

The one-way function can be any one of a number of standard hash functions (e.g. MD5, SHA, etc.). In addition, one could use several one-way functions and concatenate them. There are a wide variety of one-way functions known in the art. Typically, many of them are easy to compute, and thus they can be implemented on a smart card.

With that background, the various protocols which embody the invention will now be described, starting with a withdrawal protocol during which a customer obtains "cash" from the bank.

WITHDRAWAL PROTOCOL

A withdrawal is performed in the manner shown in FIG. 1 Customer 10 chooses a random number $x_1$ and uses f(x) to generate an image of $x_1$. The value $x_1$ is a random string obtained from a random number generator to which some post processing may optionally be applied. It may be, for example, 128 bits long. Customer 10 keeps $x_1$ secret until a payment takes place and then it is sent as the payment.

Customer 10 then withdraws a coin (non-anonymously) from Bank 30 by requesting that Bank 30 associate a monetary value with $f(x_1)$. Bank 30 complies by digitally signing a statement to that effect, thus "certifying" $f(x_1)$ as a valid coin and debits an account which Customer 10 maintains at Bank 30 by the amount of the value of the coin. In other words, Bank 30 issues a statement or representation which indicates in effect that "The first presenter of the preimage of $f(x_1)$ will be credited an amount Z" and then Bank 30 signs or certifies that representation.

Techniques for signing or certifying information (e.g. by using a private key-public key pair) and the use of digital signatures are well known in the art. For further details, refer to any of the widely recognized references in the field, e.g. *Applied Cryptography* by Bruce Schneier, John Wiley & Sons, Inc., (1994).

In general, a signature scheme is a way of tagging a script. It typically uses a public key-private key pair. Public-private keys can be implemented using one-way functions, although a somewhat more practical approach is to use a trap door function, which tends to be more efficient (e.g. see RSA, DSS, ElGamal algorithms described by Schneier). The private key is used to encrypt either the script or a hash of the script to produce a digital signature that is then appended to the script. The digital signature represents a signature of the entity which owns the private key since no other entity can generate such a signature from that script. If a second entity can decrypt the tag using the public key, it knows that the signature was generated by the entity which owns the private key.

Obviously, for certification to work, it is assumed that everyone has and trusts the signing authority's public key and has confidence that the private key has not been compromised.

By publicizing its public key and appending digital signatures to a representation that Bank 30 will pay a specified sum to the entity that first presents a preimage of $f(x_1)$, Bank 30 links itself unambiguously to its commitment, and protects itself against would-be forgers.

The certified representation that is generated by the bank is designated herein as $C(f(x_1))$, also referred to herein as a note. This note is returned to Customer 10. In addition, the note can be made publicly available since it is of no value to anybody who does not know $x_1$.

EXCHANGE PROTOCOL

At any time, a party (e.g. Customer 10 or Vendor 20) can anonymously "exchange" a coin at Bank 30. Indeed, it is particularly important to do this immediately after receiving a coin from another party to minimize the risk that somebody else will supply $x_1$ to Bank 30 before the bona fide recipient of the coin. A dishonest party could try to send the coin multiple times by giving $x_1$ to multiple parties. If that happens, the first recipient to reach Bank 30 will receive its value and all other recipients of the coin will not be able to exchange it for another coin. For Vendor 20, the timing of the exchange is less crucial because presumably Vendor 20 will not deliver the goods or services that are being purchased until being assured that the coin that was received is still valid.

Figure 2:
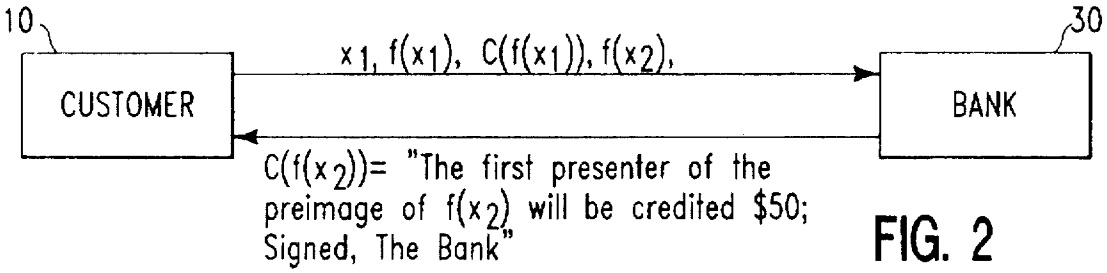
FIG. 2 is a diagram of an anonymous exchange protocol.

Referring to FIG. 2, assuming that Customer 10 wishes to anonymously exchange a coin, Customer 10 supplies to Bank 30 $x_1$ and another image of the function, $f(x_2)$, for some randomly chosen $x_2$. In other words, Customer 10 attempts to make a withdrawal as described earlier but simultaneously supplies the amount that is being withdrawn as represented by $x_1$. Bank 30 simply certifies $f(x_2)$ and keeps $x_1$ in a database 40 as proof that $f(x_1)$ has already been "spent". It is this exchange that prevents double spending of $x_1$.

Since $f(x_1)$ and $C(f(x_1))$ are already in the possession of Bank 30, the sending of that information to Bank 30 along with $x_1$ and $f(x_2)$ is optional.

If the Bank's side of the protocol is implemented on a server, it automatically stores the $x_i$'s that are received. And each time Bank 30 receives another $x_j$, the bank first checks it against the $x_i$'s that have already been cashed in (i.e., received).

One can use a series of exchange transactions to obscure who actually is spending the coin. Note that during an exchange transaction, only $f(x_2)$ need be disclosed but not the owner of $x_2$. Unlike alternative approaches to achieving anonymity, blinding of the coin or other aspects of the transaction is not necessary. Indeed, it is desirable that $f(x_i)$ not be blinded but be made publicly known.

Whatever steps one wishes to take to secure anonymity of communication is sufficient to secure anonymity of the transaction (i.e., achieving anonymity is possible but it is also optional).

This procedure can also be used to make change for a coin of a given value. Instead of sending $f(x_2)$, the party seeking the change can send multiple f(x)'s, e.g. $f(x_2)$, (x)'s $f(x_3)$, f $(x_4)$, each for a particular value and the total of which equals the value associated with $f(x_1)$. The bank returns multiple signed notes, $C(f(x_i))$.

Purchase Protocol

Figure 3:
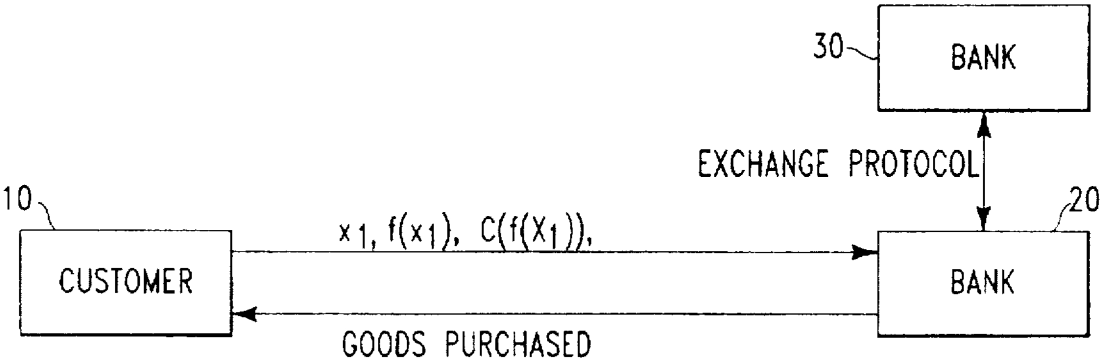
FIG. 3 is a diagram of an anonymous purchase protocol.

Referring to FIG. 3, the actual spending of coins uses a protocol that is similar to the exchange protocol. The spending party (e.g. Customer 10) passes $x_1$ to the receiving party (e.g. Vendor 20). Since it is likely that Vendor 20 does not have direct and immediate access to $f(x_1)$ and $C(f(x_1))$, Customer 10 also includes this information as part of the transaction. Vendor 20 then immediately calls Bank 30 and exchanges $x_1$ for a "fresh" coin, assuming that Bank 30 first verifies that it has not previously been spent. Vendor 20 uses the exchange protocol illustrated in FIG. 2 to perform this exchange. Assuming that the exchange was successful, Vendor 20 then delivers to Customer 10 the goods and/or services that were purchased.

DEPOSIT PROTOCOL

Figure 4:
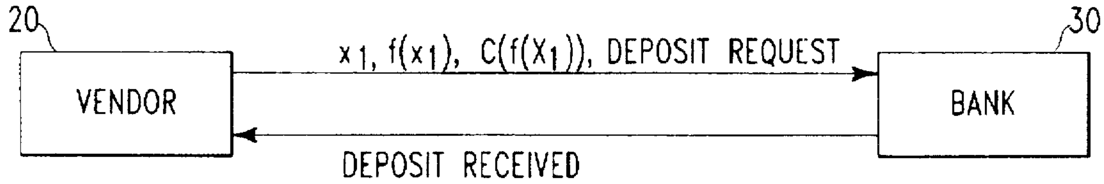
FIG. 4 is a diagram of a non-anonymous deposit protocol.
Figure 5:
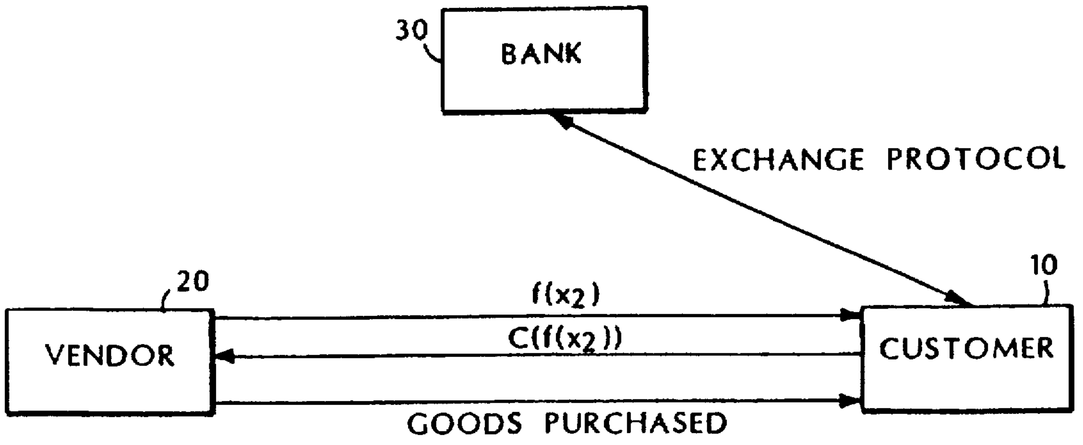
FIG. 5 is a diagram of an anonymous alternate payment protocol.

Referring to FIG. 4, unspent coins can also be deposited non-anonymously with Bank 30 at any time. For example, when Vendor 20 wishes to deposit a coin $f(x_1)$ that it has not spent, it sends $x_1$ to Bank along with a deposit request. Vendor 20 may also optionally send $f(x_1)$ as well as the note $C(f(x_1))$.

Upon receiving $x_1$ and the deposit request, Bank 30 checks its database to determine whether $x_1$ has been previously presented to the Bank. Of course, if it had been previously presented, Bank 30 will not credit the Vendor's account and will report to Vendor 20 that it is not a valid coin. If Bank 30 has not previously received $x_1$, it credits the Vendor's account with the appropriate amount and sends a deposit receipt to Vendor 20 confirming that a credit has been entered.

EXTENSIONS TO THE PROTOCOLS

The exchange payment protocols in the above-described electronic cash scheme permit a number of variations, which can be tailored to the available means of communication and the desired levels of anonymity. For example, referring to FIG. 5, if Customer 10 has easier access to Bank 30 than Vendor 20, then Vendor 20 can first supply an $f(x_2)$ to Customer 10, who then performs the exchange protocol for Vendor 20 and returns the signed coin, i.e., $C(f(x_2))$, as proof of payment. As mentioned previously, the exchange protocol may be performed anonymously.

Figure 6:
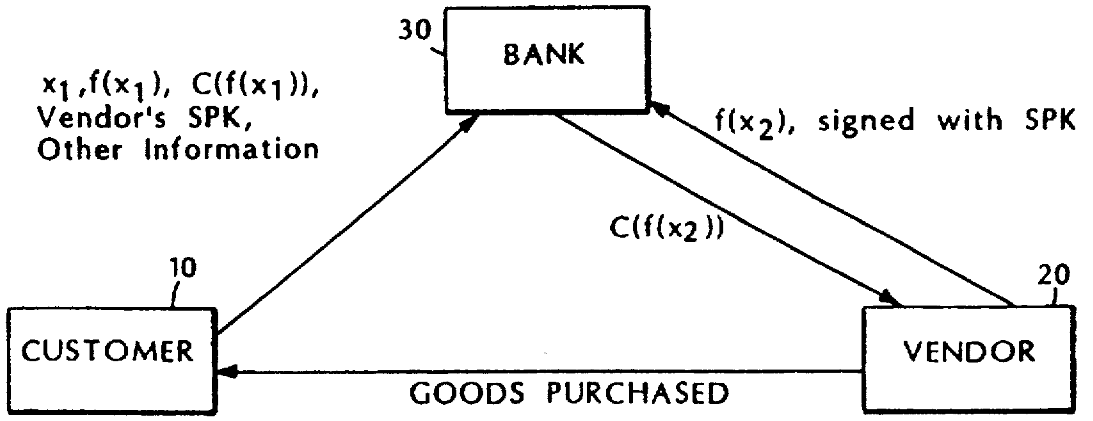
FIG. 6 is a diagram of an anonymous or non-anonymous "drop" payment or money order protocol.

Alternatively, if both Customer 10 and Vendor 20 have better communications access to Bank 30 than to each other, then the parties may use a "drop" payment protocol, such as is illustrated in FIG. 6. In accordance with this protocol, Customer 10 drops off the payment at Bank 30 for Vendor 20 and Vendor 20 subsequently picks up the payment from Bank 30.

The steps of the "drop" payment protocol are as follows. First, Customer 10 supplies an $x_2$ for a valid coin of a specific amount to Bank 30, along with a public signature key p of Vendor 20, and other information relating to the transaction. For example, among the other information Customer 10 might wish to identify the goods being purchased, to identify the transaction and/or the vendor, and to indicate the declared of the customer intentions regarding payment, thereby essentially turning the cash into a kind of "electronic money order". Optionally, Customer 10 can also send $f(x_1)$ and the note $C(f(x_1))$, but as pointed out earlier, since this information is already available to Bank 30, sending it may not be necessary.

Note that the a record that may be assembled from the other information supplied by Customer 10 may be of particular use in remote payment settings, where the nature of the transaction is not otherwise implicit in the action of payment itself, as is typically the case for in-person payments.

If Vendor 20 does not wish to remain anonymous, the public signature key may be publicly associated with the identity of Vendor 20; or if anonymity is desired, the public signature key can be a special-purpose public signature key with no associated identity. In the latter case, the public key is passed confidentially to trusted acquaintances or simply publicized under a pseudonym.

Bank 30 agrees to assign the amount associated with $x_1$ to the first coin $f(x_i)$ presented to it that it is also signed using the private signature key that corresponds with the previously-delivered public signature key p. Thus to obtain the payment for the goods that Customer 10 wishes to purchase, Vendor 20 simply makes a withdrawal from Bank 30 using the protocol previously described in connection with FIG. 1. That is, Vendor 20 randomly selects an $x_2$, and uses f(x) to generate its image $f(x_2)$. In this instance, however, Vendor 20 signs $f(x_2)$ with its private signature key before sending $f(x_2)$ to Bank 30. In addition, in this case the withdrawal is not from the account of the vendor but is simply a transfer of the amount previously supplied by Customer 10.

Bank 30 uses the Vendor's public signature key of the vendor to verify that $f(x_2)$ is signed by Vendor 20 (i.e., by the party to whom the money transfer is to be made). Upon confirming the signature on $f(x_2)$, Bank 30 issues a note $C(f(x_2))$ which it sends to Vendor 20.

After Vendor 20 receives the note $C(f(x_2))$ confirming that the money has been received, Vendor 20 sends the goods to Customer 10. of course, theoretically Bank 30 could cheat by simply keeping the money instead of assigning it to the payee. However, we rely on the anonymity of the payer or at least the possibility that the payer may be exposing the transaction to public monitoring to keep Bank 30 honest.

In a setting where communications among the parties may be intercepted, there are a number of ways of securing the exchange protocols and, in particular, the secret x value passed therein from eavesdroppers. The most natural method is public key encryption. If parties know public encryption keys of each other, as well as of the bank, then all of the above protocols can function equally well in the eavesdropper-threatened setting, as long as every message, except those sent by Bank 30, is encrypted using the public encryption key of the receiver or using a symmetric "session key" encrypted using the receiver's public encryption key. The messages of the bank, of course, can be considered non-confidential, since they consist only of signed coins of the form $f(x_i)$, with $x_i$ kept secret by someone else. The use of message authentication codes, or MAC's, with each encryption makes it possible also to ensure that the message is not even tampered with by someone other than the sender before arriving at its destination.

Figure 7:
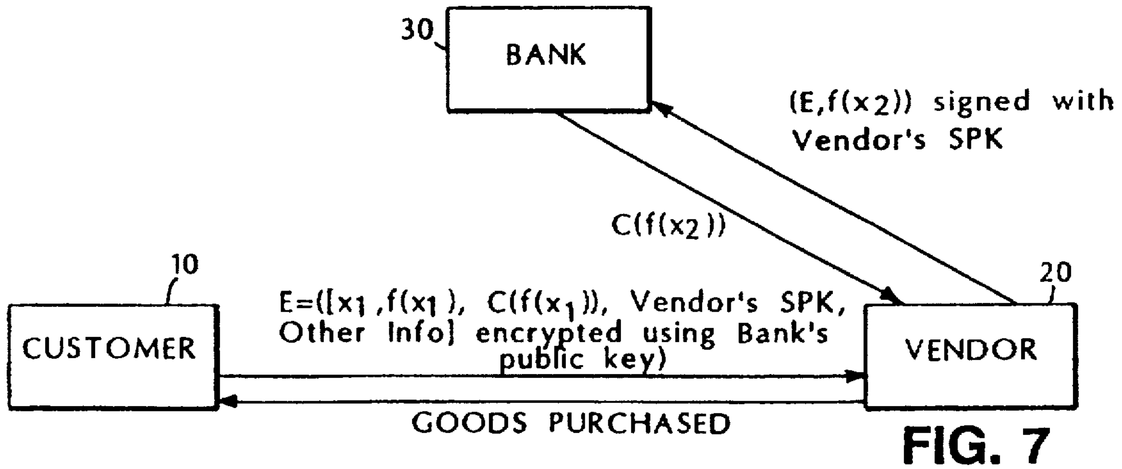
FIG. 7 is a diagram of an encrypted money order protocol.

The use of public-key encryption also makes possible another kind of "electronic money order." In this case, which is illustrated in FIG. 7 and referred to generally as an encrypted money order protocol, Customer 10 encrypts the secret $x_i$ value for some valid electronic coin, along with the public key p of Vendor 20 and any other desired identity or transaction information, as in the case of the previous "drop" protocol. Customer 10 encrypts this information by using the public encryption key of the bank or by using a session key which is then encrypted using the public encryption key of the bank. Customer 10 then sends the encrypted data directly to Vendor 20.

To "cash" it, Vendor 20 selects a random value $x_2$, generates its image $f(x_2)$ and appends $f(x_2)$ to the message E that was received from Customer 10. As before, $f(x_2)$ is to be signed by the bank so that it will represent the transfer of cash to Vendor 20. Vendor 20 signs the complete message (or at least $f(x_2)$) using the private signature key associated with public signature p, and passes E, $f(x_2)$ and the signature to Bank 30. Optionally, Vendor 20 may further encrypt this message in the manner described before, i.e., using the banks encryption key and possibly an additional symmetric key.

After Bank 30 has decrypted the message from Vendor 20 by using its private key, it then checks its database to determine if it does not already have $x_1$ stored therein, and if it is not found, Bank 30 stores $x_1$. Bank 30 then generates a note $C(f(x_2)$ representing a cash transfer to Vendor 20 in the amount of the value associated with $f(x_1)$. The note is then sent to Vendor 20 which after receipt and verification sends the purchased goods to Customer 10.

In effect, this encrypted last protocol is identical to the previous one. The addition of encryption has simply permitted the payer to pass the "money order" via the payee, while ensuring that the secret and additional information provided by the payer is not tampered with.

It may be beneficial for the note, $C(f(x_i)$, to include an expiration date. In that case, the stored $x_i$s in the database of Bank 30 will not grow too large. That is, $x_1$s will not have to kept around in the database of the Bank forever. To prevent the value of the coins from expiring, the smartcard (or whatever equipment is handling the customer's transactions) could automatically exchange the old coins for new ones with a new expiration date.

The expiration date also makes the money refundable. If a user's smartcard breaks and all of the $x_i$ s are lost, the user can simply present the $f(x_i)$ to Bank 30 with the request that if they are not claimed within 3 months after the expiration date, then the user, e.g. customer 10 wants to be credited with the amount of the value of the coins. For this to work, however, during the original communication with Bank 30 at which time the coins are withdrawn, Customer 10 must identify himself or herself.

The customer side of the protocols can be easily implemented using a smartcard since only the $x_i$'s need to be stored and they typically will not require a lot of memory. To prevent theft of the $x_i$'s by somebody who would steal the smartcard, a PIN can be used in the smartcard which is secret and which must be entered by the user before any of the $x_i$'s can be accessed.

Note that it was also assumed that all of the interactions that were described above were automated. That is, they were automatically carried out by an appropriately programmed computer or processor that was under the control of the party for whom the transaction is being implemented.

Other embodiments are within the following claims. For example, another way to link identifying information to electronic coins is to use the secret value $x_i$ to perform the linking. In the above-description, it was assumed that the secret values $x_i$ are generated randomly by the coin's creator. The secret value can, however, be generated as the image of some identifying data under a one-way function h(x), which could perhaps be the same function f(x) that is used in the construction of normal electronic coins. The identifying information might include the purpose and date of the payment and the name of the payer and the intended payee —in short, all of the information that the payer might have wished the bank to archive. This information would then be passed through h(x) to generate an $x_i$, which serves as the secret value.

In this case, there would be no need for the bank to archive transaction information received with electronic payments in either the "drop" or "electronic money order" protocols described above. In fact, all that is required is that the payment be labeled as requiring that the payee be non-anonymous. As long as the bank positively identifies the payee and keeps normal records of the transaction, including the payee's identity, the payer can later demonstrate "payership" by publicly revealing the pre-image of $x_i$; under f(x), which as indicated above might include information regarding the purpose and date of the payment and the names of the payer and the intended payee. The payer can obtain coins with such implicitly information carrying $x_i$; values simply by constructing them normally, and then exchanging other coins for them. In this context, however, the payment information need not even be sent to the bank, since it is implicitly contained in $x_i$. Hence, the only information that the payer needs to pass securely to the bank is the public signature key to be used to identify the payee, which implicitly communicates the requirements that the payer be non-anonymous.

In fact, even this latter requirement of signature-based payee identification can be eliminated if information is embedded in $x_i$(or $f(x_i)$ to the effect that the bank is not to honor the cash non-anonymously. For example, some property of $x_i$ (e.g. the value of the first bit being 1) might be publicly declared by the bank to indicate that the coin in question will only be honored non-anonymously. A payer can then generate a secret $x_i$ by computing $f(s_j)$, where $s_i$ is the concatenation of the payment information for an intended transaction with some random value r, chosen such that $x_i$ has the non-anonymity property. Note that the property should be chosen such that roughly half the pre-images $s_j$ of f(s) of any particular length result in an $f(s_j)$ with the property, so that not many attempts to choose r will be necessary before one is found that has the desired effect on $x_i$). This coin would now have the property that anyone presenting it for redemption must also provide an identity and prove it to the bank's satisfaction so that the bank can record the identity of the exchanger as part of its normal accounting. As a result, the coin's creator would later be able to demonstrate its origin, as well as other details of the transaction in which it was intended to be used, by referring to the bank's accounting records and revealing the $s_j$. used to generate $x_i$. Hence, even if the coin is spent completely normally, with no extra encryption or attendant information for the bank, it still provides the payer with all the protection furnished by the "electronic money order" described earlier.

What is claimed is:

1. A method of implementing an electronic cash protocol comprising the steps of:

using a one-way function $f_1(x)$ to generate an image $f_1(x_1)$ from a preimage $x_1$;

sending the image $f_1(x_1)$ in an unblinded form to a second party; and receiving from the second party a note including a digital signature, said note representing a commitment by the second party to credit a predetermined amount of money to a first presenter of said preimage $x_1$ to the second party.

2. The method of claim 1 further comprising sending the preimage $x_1$ to a third party as payment for purchase of goods or services from the third party.

3. The method of claim 1 further comprising:

selecting a second preimage $x_2$;

using a second one-way function $f_2(x)$to generate a second image $f_2(x_2)$ from the second preimage $x_2$;

sending the first preimage $x_1$ and the unblinded form of the second image $f_2(x_2)$ to the second party; and receiving from the second party a second note including a digital signature, said second note representing a commitment by the second party to credit said predetermined amount of money to a first presenter of said second preimage $x_2$ to the second party.

4. The method of claim 3 wherein functions $f_1(x)$ and $f_2(x)$ are identical to each other.

5. The method of claim 4 wherein the step of sending the first preimage $x_1$ and the unblinded form of the second image $f_2(x_2)$ to the second party is performed anonymously.

6. The method of claim 5 wherein the second party is a bank.

7. The method of claim 3 further comprising sending the second preimage $x_2$ to a third party as payment for purchase of goods or services from the third party.

8. The method of claim 1 further comprising:

concatenating a signature key of a third party with the first preimage $x_1$ to form a block of information;

encrypting the block of information by using an encryption key of the second party to generate an encrypted block of information; and sending the encrypted block of information to the third party.

9. A method of implementing an electronic cash protocol comprising the steps of:

receiving a first preimage $x_1$ from a first party, said preimage $x_1$ producing a first image $f_1(x_1)$ when processed by a first one-way function $f_1(x)$ and there being associated with said first preimage $x_1$ a commitment by a second party to credit a predetermined amount of money to a first presenter to the second party of said first preimage $x_1$;

selecting a second preimage $x_2$;

using a second one-way function $f_2(x)$to generate a second image $f_2(x_2)$ from the second preimage $x_2$;

sending the first preimage $x_1$ and an unblinded form of the second image $f_2(x_2)$ to the second party; and receiving from the second party a note including a digital signature, said note representing a commitment by the second party to credit said predetermined amount of money to a first presenter of said second preimage $x_2$ to the second party.

10. The method of claim 9 wherein functions $f_1(x)$ and $f_2(x)$ are identical to each other.

11. The method of claim 9 wherein the step of sending the first preimage $x_1$ and the unblinded form of the second image $f_2(x_2)$ to the second party is performed anonymously.

12. A method of implementing an electronic cash protocol comprising the steps of:

receiving from a first party an encrypted block of information, wherein said block of encrypted information was generated by first concatenating a public signature key of a second party with a first preimage $x_1$ to form a block of information and then encrypting the block of information by using an encryption key of a third party;

selecting a second preimage $x_2$;

using a second one-way function $f_2(x)$ to generate an image $f(x_2)$ from the preimage $x_2$;

forming a message including the encrypted block of information along with the image $f(x_2)$ in an unblinded form;

sending the message to the third party; and receiving from the third party a signed note including a digital signature, said note representing a commitment by the third party to credit a predetermined amount of money to a first presenter of said preimage $x_2$ to the third party.

13. The method of claim 12 wherein functions $f_1(x)$ and $f_2(x)$ are identical to each other.

14. The method of claim 12 further comprising signing the message before sending it to the third party, wherein the step of signing is performed using a private signature key corresponding to a public signature key possessed by the third party.

15. The method of claim 12 wherein the second party is the party receiving the encrypted block of information from the first party.

16. A method of implementing an electronic cash protocol comprising the steps of:

receiving from a first entity an unblinded form of an image $f_1(x_1)$ that was generated by applying a one-way function $f_1(x)$ to a preimage $x_1$;

generating a message which contains a commitment to credit a predetermined amount of money to a first presenter of said preimage $x_1$;

signing said message with a digital signature; and sending said message along with said digital signature to said first party.

17. The method of claim 16 wherein the receiving party maintains an account for the first entity and wherein said protocol further comprises debiting the first party's account by the predetermined amount of money.

18. The method of claim 16 further comprising:

subsequently receiving the preimage $x_1$ from a third party;

checking a database for the preimage $x_1$;

if the preimage $x_1$ is not found in said database, crediting the third party with said predetermined amount of money; and adding the preimage $x_1$ to said database.

19. The method of claim 16 further comprising:

subsequently receiving the preimage $x_1$ and an unblinded image $f_2(x_2)$ from a third party, wherein the unblinded image $f_2(x_2)$ was generated by applying a one-way function $f_2(x)$ to a preimage $x_2$;

checking a database for the preimage $x_1$;

if the preimage $x_1$ is not found in said database, generating a signed note including a digital signature, said note representing a commitment to credit said predetermined amount of money to a first presenter of said preimage $x_2$; and adding the preimage $x_1$ to said database.

20. The method of claim 19 wherein functions $f_1(x)$ and $f_2(x)$ are identical to each other.

21. The method of claim 16 further comprising:

receiving a message from a second party, wherein said message was generated by concatenating an encryption key of a third party with a first preimage $x_1$ to form a block of information, by encrypting the block of information by using a first encryption key to generate an encrypted first block, and by concatenating an unblinded image $f_2(x_2)$ to the encrypted first block of information, wherein said unblinded image $f_2(x_2)$ was generated by using a one-way function $f_2(x)$ to generate an image $f_2(x_2)$ from a preimage $x_2$;

decrypting the encrypted first block of information;

generating a note including a digital signature, said note representing a commitment to credit a predetermined amount of money to a first presenter of said preimage $x_2$; and sending said note to the second party.

22. The method of claim 21 wherein functions $f_1(x)$ and $f_2(x)$ are identical to each other.

23. The method of claim 21 further comprising:

checking a database for the preimage $x_1$;

generating the signed note only if the preimage $x_1$ is not found in said database; and adding the preimage $x_1$ to said database.

24. A method of implementing an electronic cash protocol comprising the steps of:

obtaining a first image $f(x_1)$ and a first preimage $x_1$, wherein said first preimage $x_1$ has a predetermined monetary value associated therewith;

selecting a second preimage $x_2$;

using a second one-way function $f_2(x)$to generate a second image $f_2(x_2)$ from the second preimage $x_2$;

sending the first preimage $x_1$ and an unblinded form of the second image $f_2(x_2)$ to the second party; and receiving from the second party a note including a digital signature, said note representing a commitment by the second party to credit a predetermined amount of money to a first presenter of said second preimage $x_2$ to the second party, wherein said predetermined amount of money is no greater than said predetermined monetary value.

25. The method of claim 24 wherein said predetermined amount of money is less than said predetermined monetary value.

26. The method of claim 24 wherein $fx_1(x)$ equals $f_2(x)$.

27. A method of implementing an electronic cash protocol comprising the steps of:

obtaining a first image $f(x_1)$ and a first preimage $x_1$, wherein said first preimage $x_1$ has a predetermined monetary value associated therewith;

selecting a plurality of preimages $x_i$, wherein I is an integer index that runs from 1 to n, where n is a positive integer;

using a second one-way function $f_2(x)$ to generate a plurality of images $f_2(x_i)$ from the second preimages $x_i$;

sending the first preimage $x_1$ and an unblinded form of all of the images $f_2(x_i)$ to the second party; and receiving from the second party a plurality of each including a digital signature, said plurality of notes equal in number to the plurality of images $f_2(x_i)$ and representing a plurality of predetermined amounts, each of said plurality of notes representing a commitment by the second party to credit a corresponding different one of said plurality of predetermined amounts of money to a first presenter of the corresponding preimage $x_i$ to the second party, wherein the total of said plurality of predetermined amounts of money equals said predetermined monetary value.

28. A method of implementing an electronic cash protocol comprising the steps of:

obtaining a first image $f(x_1)$ and a first preimage $x_1$, wherein said first preimage $x_1$ has a predetermined monetary value associated therewith;

concatenating a signature key of a second party with the first preimage $x_1$ to form a block of information;

encrypting the block of information by using an encryption key of a third party to generate an encrypted block of information; and sending the encrypted block of information to the third party.

29. The method of claim 28 further comprising concatenating other information with the signature key of a second party and the first preimage $x_1$ to form the block of information.

30. A method of implementing an electronic cash protocol comprising the steps of:

sending an unblinded image $f_2(x_2)$ to a second party, wherein the unblinded image $f_2(x_2)$ was generated by applying a one-way function $f_2(x)$ to a preimage $x_2$;

receiving a signed note from the second party, said unblinded note including a digital signature, said unblinded note representing a commitment to credit said predetermined amount of money to a first presenter of said preimage $x_2$; and in response to receiving the unblinded note from the second party, authorizing the delivery of goods or services to a third party.

* * * * *

UNITED STATES PATENT AND TRADEMARK OFFICE

CERTIFICATE OF CORRECTION

PATENT NO. : 5,768,385

DATED : June 16, 1998
INVENTOR(S) : Daniel R. Simon

It is certified that error appears in the above-identified patent and that said Letters Patent is hereby corrected as shown below:

Column 1, line 36 Change "preserved." to --preserved?--;

Column 2, line 1 Delete "and";

Column 2, line 4 Change "The anonymity of spenders" to --Not only does the system protect the anonymity of spenders--;

Column 3, line 50 Change "$f_2$ ($X_2$ )" to --$f_2(X_2)$--;

Column 5, line 9 Change "bark" to --bank's--;

Column 8, line 16 After "information", insert a comma;

Column 8, line 19 Change "the declared of the customer intentions" to --the declared intentions of the customer--;

Column 8, line 42 After "Thus", insert a comma;

Column 8, line 53 Delete "Vendor's";

UNITED STATES PATENT AND TRADEMARK OFFICE

CERTIFICATE OF CORRECTION

PATENT NO. : 5,768,385

DATED : June 16, 1998

INVENTOR(S) : Daniel R. Simon

It is certified that error appears in the above-identified patent and that said Letters Patent is hereby corrected as shown below:

Column 9, line 42 After "and", insert a comma;

Column 9, line 56 After "to", insert --be--;

Column 10, line 5 After "stored", insert a semicolon;

Column 10, line 5 Delete "and".

Signed and Sealed this

Twenty-second Day of September, 1998

*Attest:*

BRUCE LEHMAN

*Attesting Officer*

*Commissioner of Patents and Trademarks*